(12) United States Patent
Aldrich

(10) Patent No.: US 9,252,584 B2
(45) Date of Patent: Feb. 2, 2016

(54) APPARATUS AND METHOD FOR PROVIDING TETHERED ELECTRICAL POWER TO AUTONOMOUS MOBILE ROBOTS

(71) Applicant: Brett Aldrich, Thousand Oaks, CA (US)

(72) Inventor: Brett Aldrich, Thousand Oaks, CA (US)

(*) Notice: Subject to any disclaimer, the term of this patent is extended or adjusted under 35 U.S.C. 154(b) by 252 days.

(21) Appl. No.: 13/955,645

(22) Filed: Jul. 31, 2013

(65) Prior Publication Data

US 2014/0360832 A1  Dec. 11, 2014

Related U.S. Application Data

(60) Provisional application No. 61/832,109, filed on Jun. 6, 2013.

(51) Int. Cl.
| | | |
|---|---|---|
| H02G 11/02 | (2006.01) | |
| B60L 9/08 | (2006.01) | |
| H02G 11/00 | (2006.01) | |

(52) U.S. Cl.
CPC ........... *H02G 11/02* (2013.01); *B60L 9/08* (2013.01); *H02G 11/00* (2013.01)

(58) Field of Classification Search
CPC .......... H02G 11/00; H02G 11/02; B60L 9/08; B60L 11/1816; B60L 11/1818
USPC ................................. 191/12.2 R, 12.2 A, 12.4
See application file for complete search history.

(56) References Cited

U.S. PATENT DOCUMENTS

| | | | |
|---|---|---|---|
| 4,679,152 A | | 7/1987 | Perdue |
| 4,736,826 A | * | 4/1988 | White .................. B25J 5/007 191/12.2 A |
| 4,954,091 A | | 9/1990 | Marble et al. |
| 5,647,554 A | * | 7/1997 | Ikegami .............. B25J 19/0025 191/12.2 A |
| 5,710,870 A | | 1/1998 | Ohm et al. |
| 5,982,139 A | | 11/1999 | Parise |
| 6,157,162 A | * | 12/2000 | Hayashi ............. B60L 11/1818 320/104 |
| 6,725,986 B2 | | 4/2004 | Reindle et al. |
| 7,999,506 B1 | | 8/2011 | Hollar et al. |
| 8,473,131 B2 | * | 6/2013 | Leary ................. B60L 11/1824 180/65.29 |
| 9,056,555 B1 | * | 6/2015 | Zhou ................... B60L 11/1827 |
| 2009/0149995 A1 | * | 6/2009 | Kaneko ................. B25J 19/005 700/258 |
| 2010/0180711 A1 | | 7/2010 | Kilibarda et al. |
| 2011/0175557 A1 | | 7/2011 | Iwashita et al. |
| 2011/0316711 A1 | | 12/2011 | Ho et al. |

(Continued)

OTHER PUBLICATIONS

Meeussen et al., "Autonomous Door Opening and Plugging in with a Personal Robot", Jan. 2, 2011, Willow Garage, https://www.willowgarage.com/sites/default/files/m2.pdf, pp. 1-8.*

*Primary Examiner* — Zachary Kuhfuss
(74) *Attorney, Agent, or Firm* — Volentine & Whitt, PLLC

(57) ABSTRACT

An apparatus includes a robot arm, an electrical power cord, a motor-driven cable reel, an end effector, and at least one sensor. The robot arm has a proximal end and a distal end, and is configured to move in response to one or more electrical signals. The electrical power cord extends through the robot arm from the proximal end to the distal end and has an electrical plug at an end thereof. The motor-driven cable reel dispenses and retracts the electrical power cord so as to control a length thereof. The end effector is disposed at the distal end of the robot arm, and is configured to selectively grasp and release the electrical plug. The sensor is disposed at the distal end of the robot arm, and is configured to produce sensor data for controlling the robot arm to dock the electrical plug into an electrical receptacle.

30 Claims, 15 Drawing Sheets

(56) References Cited

U.S. PATENT DOCUMENTS

| | | | |
|---|---|---|---|
| 2012/0043935 A1* | 2/2012 | Dyer | B60L 1/003 320/109 |
| 2012/0088382 A1 | 4/2012 | Konchan | |
| 2012/0109798 A1 | 5/2012 | Shelton et al. | |
| 2014/0013893 A1* | 1/2014 | Asano | B25J 18/00 74/490.02 |
| 2014/0027228 A1* | 1/2014 | Tojima | E02F 9/207 191/12.2 A |
| 2014/0083229 A1* | 3/2014 | Kume | B25J 19/0025 74/490.02 |

\* cited by examiner

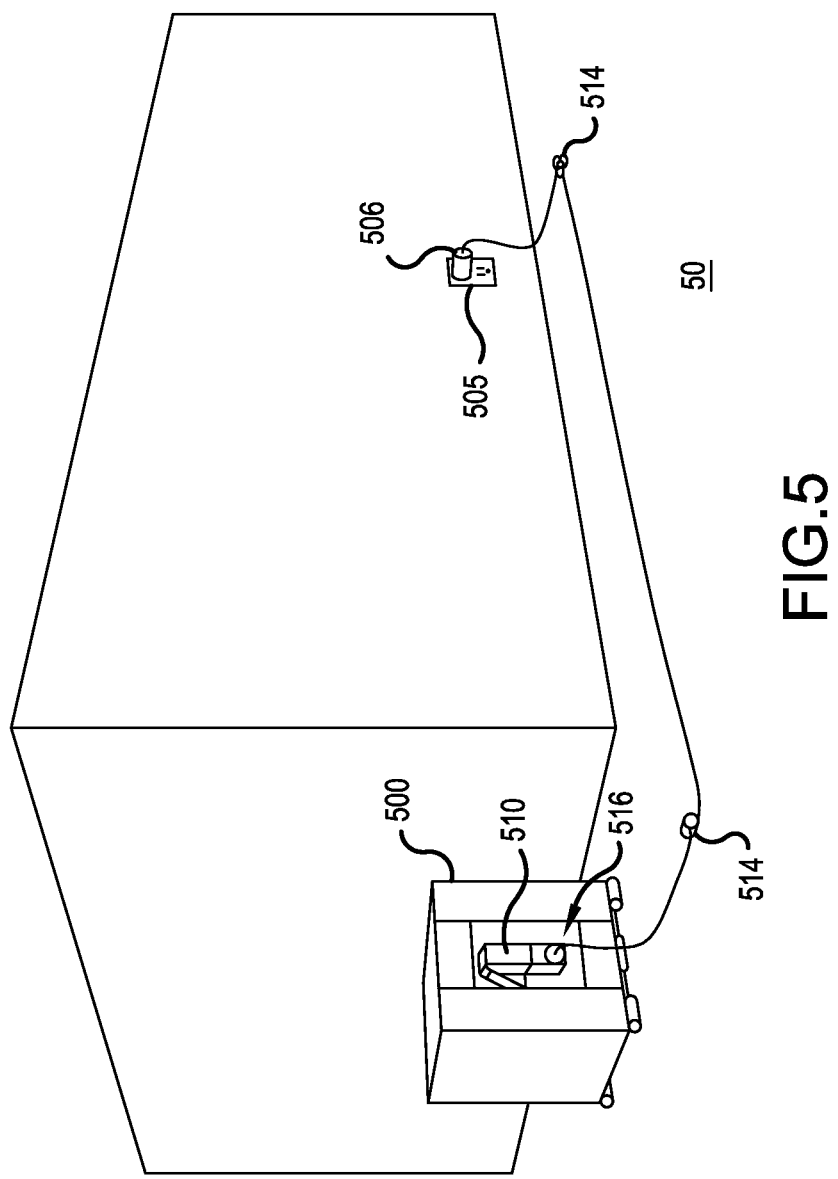

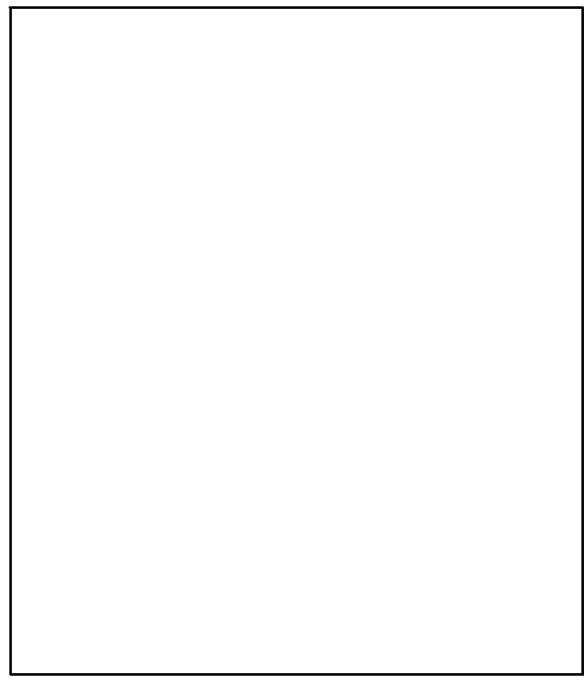
FIG.12

APPARATUS AND METHOD FOR PROVIDING TETHERED ELECTRICAL POWER TO AUTONOMOUS MOBILE ROBOTS

CROSS-REFERENCES TO RELATED APPLICATIONS

This patent application claims priority under 35 U.S.C. §119(e) from U.S. Provisional Patent Application 61/832, 109, filed on 6 Jun. 2013, which is hereby incorporated by reference herein.

BACKGROUND AND SUMMARY

This invention pertains to the field of robotic devices, and in particular to mobile robotic devices which are configured to receive electrical power, e.g. alternating current (AC) electrical power, from an electrical receptacle or outlet via an electrical cord.

The use of mobile robotic devices ("mobile robots") to perform a variety of domestic and industrial tasks continues to grow. Mobile robots have wheels, rollers, continuous tracks, mechanical legs (e.g., a biped, quadruped, hexapod, etc.) or other locomotion means which allow them to navigate within a workspace such as an apartment, a factory, a warehouse, etc. In general, a mobile robot may navigate autonomously ("autonomous mobile robot"), or under remote control, for example under human control via a joystick, mouse, trackball, keyboard, etc. Autonomous mobile robots have operational advantages due to the lack of need for human intervention, for example lower operating costs (e.g., labor costs), the ability to operate at places and times where remote control is not available, etc.

In many cases, mobile robots are battery powered, which limits the amount of work they are able to perform to the power storage and output capacities of the batteries. However, battery power may not provide sufficient electrical power for mobile robots to perform certain tasks, or to utilize machine and device components that would be powerful enough to perform such tasks. In addition, as larger and more sophisticated batteries are used to increase the power which can be stored and exerted by mobile robots, the size, weight, and expense of the mobile robots become too large for them to be practically deployed in many environments, such as residential homes or narrow commercial hallways.

So in many situations, it would be desirable to deploy a mobile robot which could operate on power which is provided from an electrical outlet or receptacle (e.g., AC Mains power), for example via an electrical power cord, without first being stored in a battery. This would allow a mobile robot to utilize the wide variety of available alternating current powered electrical motors and tools, which would otherwise be impossible, impractical or more expensive to operate with direct current (DC) powered electrical components, and/or AC/DC conversion via a power inverter. Such a mobile robot may also include a battery, which may be charged from the electrical power (e.g., AC Mains power) received via the electrical outlet or receptacle. In some cases, the mobile robot may have some reduced or limited operation on batter power, for example, the robot may be able to navigate over some distance on battery power alone.

As noted above, one class of mobile robots are autonomous mobile robots which self-navigate without remote or human control. However, if an autonomous mobile robot requires human intervention to connect it to an electrical outlet or receptacle, disconnect it from electrical outlet or receptacle, manage the length of the electrical power cord, etc., then the operational advantages of autonomous operation may be reduced or defeated.

Accordingly, it would be advantageous to provide an autonomous mobile robot which can autonomously locate, connect to, and disconnect from common 110V, 220V (and their international equivalent) household, commercial, and industrial electrical outlets and receptacles (i.e., connected to AC Mains). It would also be advantageous to provide an autonomous mobile robot which can autonomously manage a tethered connection to an electrical outlet or receptacle, including managing the length of an electrical power cord extending between the autonomous mobile robot and the electrical outlet or receptacle. Other and further objects and advantages will appear hereinafter.

The present invention comprises an apparatus and method for providing tethered electrical power to an autonomous power robot.

In one aspect of the invention, an apparatus comprises: a robot arm having a proximal end and a distal end, the robot arm being configured to move in response to one or more electrical signals; an electrical power cord extending through the robot arm from the proximal end to the distal end, the electrical power cord having an electrical plug at an end thereof; a motor-driven cable reel configured to dispense and retract the electrical power cord so as to control a length thereof; an end effector disposed at the distal end of the robot arm, wherein the end effector is configured to selectively grasp and release the electrical plug; and at least one sensor disposed at the distal end of the robot arm, wherein the at least one sensor is configured to produce sensor data for controlling the robot arm to dock the electrical plug into an electrical receptacle.

In another aspect of the invention, an apparatus comprises: an electrical receptacle configured to be mated to an electrical plug and to supply electrical power to the electrical plug; and a beacon array disposed adjacent to the electrical receptacle configured to transmit one or more signals indicating a location of the electrical receptacle.

In still another aspect of the invention, a method is provided for operating an apparatus comprising a robot having a cable reel for dispensing an electrical power cord having an electrical plug at an end thereof. The method comprises: while the electrical plug is connected to an electrical receptacle, controlling the apparatus to move about; and while the electrical plug is connected to an electrical receptacle and the apparatus moves about, controlling a length of the electrical power cord and a rate of dispensing the electrical power cord using a navigation plan stored as navigation data in a memory device of the apparatus, the navigation plan describing a navigation path and speed to be traveled by the robot during a specified time and/or event interval.

In a still further aspect of the invention, a method is provided for operating a mobile robot configured to dispense an electrical power cord having an electrical plug at an end thereof. The method comprises: while the electrical plug is connected to an electrical receptacle, controlling the mobile robot to move about; and while the electrical plug is connected to an electrical receptacle and the mobile robot moves about, controlling a length of the electrical power cord and a rate of dispensing the electrical power cord using a navigation plan stored as navigation instructions in one or more memory devices of the mobile robot, the navigation instructions being configured to cause one or more processors of the mobile robot to actuate one or more motors of the mobile robot which move the mobile robot with respect to some fixed point in relation to the electrical receptacle during a discrete computing event interval.

BRIEF DESCRIPTION OF THE DRAWINGS

FIG. 5 illustrates an embodiment of a mobile robot which is receiving electrical power from an electrical receptacle while moving about a room.

FIG. 12 illustrates a sequence of steps in an example navigation operation of an autonomous mobile robot which receives electrical power from a tethered connection to an electrical receptacle.

DETAILED DESCRIPTION

Figure 1:
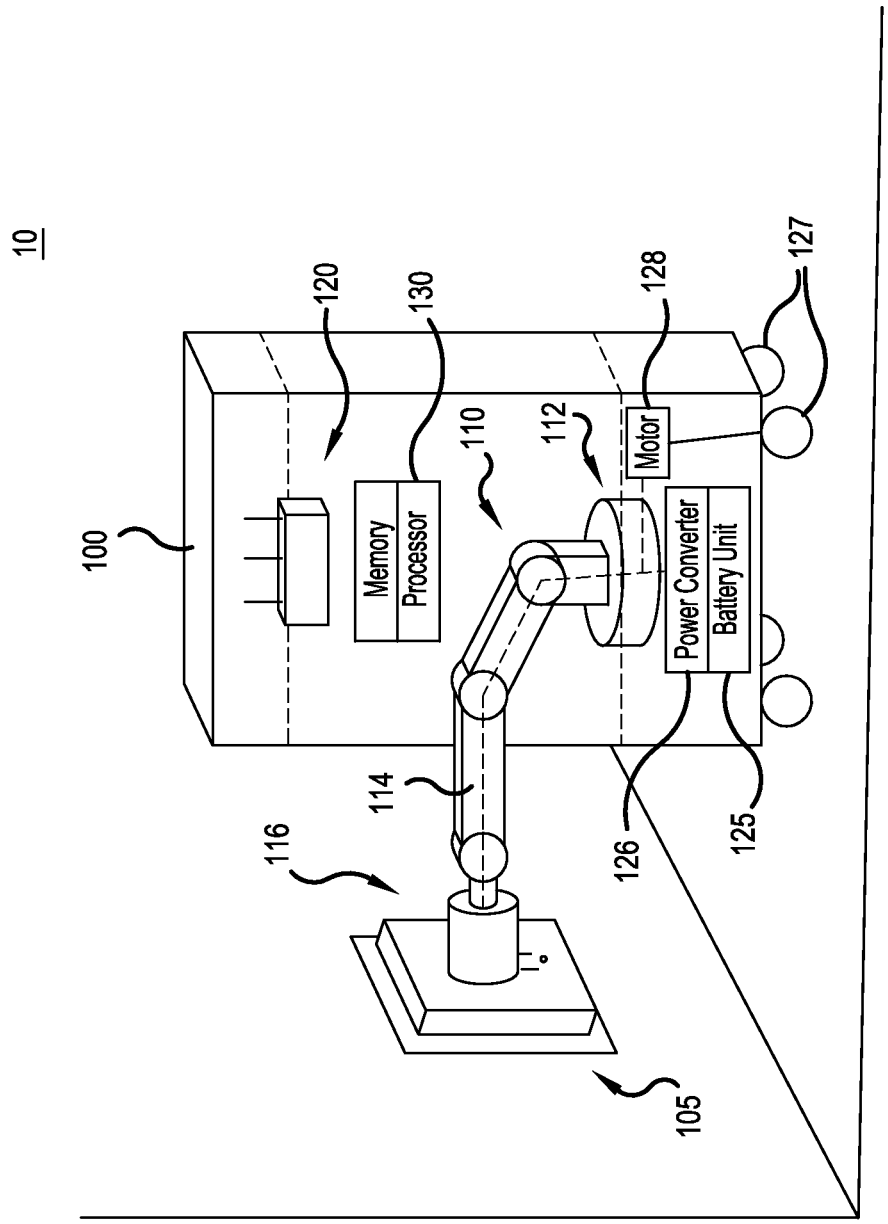
FIG. 1 illustrates an embodiment of a system including a mobile robot which is plugged into an electrical receptacle.

FIG. 1 illustrates an embodiment of a system 10 including a mobile robot 100 which is plugged into an electrical receptacle of an electrical receptacle docking station 105. In some embodiments, mobile robot 100 may comprise an autonomous mobile robot. Mobile robot 100 comprises a robot arm 110, a communications unit 120, a battery unit 125, a power converter 126, a plurality of wheels 127 driven by one or more motors 128, and a processor 130 with associated memory.

The one or more motors 128 may be provided for controlling the movement of mobile robot 100 via wheels 127. In some embodiments, one or more motors 128 may include an alternating current (AC) motor driven by electrical power received from an electrical receptacle (e.g., electrical receptacle docking station 105) via electrical power cord 114 and an electrical plug (not shown in FIG. 1, but see FIG. 3) attached to electrical power cord 114, for example without first being stored in battery unit 125. Although not depicted in FIG. 1, mobile robot 100 may further include additional motors, arms, tools, and implements for performing one or more tasks that are assigned to mobile robot 100. In some embodiments, one or more of these additional motors, arms, tools, and implements may be driven by alternating current electrical power received from an electrical receptacle (e.g., electrical receptacle docking station 105) via electrical power cord 114 and an electrical plug (not shown in FIG. 1, but see FIG. 3) attached to electrical power cord 114, for example without first being stored in battery unit 125. In various embodiments, mobile robot 100 may be configured to perform any number of different tasks, which may include but are not limited to vacuuming, sweeping, lifting and/or transporting objects, capturing images and/or audio, turning screws and/or bolts, fastening objects together, etc. Although not depicted in FIG. 1, mobile robot 100 may further include one or more sensors which are configured to sense the (linear) velocity of mobile robot 100 and/or robot arm 110; the (linear) acceleration of mobile robot 100 and/or robot arm 110; the rotational velocity of mobile robot 100 and/or robot arm 110; and/or the rotational acceleration of mobile robot 100 and/or robot arm 110.

In various embodiments, electrical receptacle docking station 105 may include a household, commercial, or industrial electrical receptacle for supplying a standard voltage (e.g., 110 VAC, 220 VAC, 480 VAC, 3-Phase, etc.) from AC Mains.

As will be described in greater detail below, mobile robot 100 is able to autonomously locate, connect and manage corded/tethered wire electrical connections to various electrical receptacles (e.g., electrical receptacle docking station 105) as mobile robot 100 moves about a workspace to accomplish one or more tasks to which it has been assigned or programmed. The workspace may comprise one or more rooms, hallways, aisles, warehouses, factory(ies), etc.

Robot arm 110 includes, or has associated therewith, a cable reel 112 for dispensing electrical power cord 114 having an electrical plug (not shown in FIG. 1, but see FIG. 3) attached at a first end thereof. In some embodiments, the second end of electrical power cord 114 may be connected to one or more motors, arms, tools, and implements of mobile robot to supply power (e.g., AC power) thereto. Robot arm 110 also has an end effector 116 at an end thereof for selectively grasping, moving, rotating, and releasing the electrical plug to selectively establish and disengage an electrical connection with electrical receptacle docking station 105, for example under control of a processor (e.g., processor 130), as will be described in greater detail below. In various embodiments, robot arm 110 may be mounted at a side of mobile robot 100 or on top of mobile robot 100.

In various embodiments, communications unit 120 may include a wireless communication device and/or a non-wireless communications port. In some embodiments, communications unit 120 may include a radio frequency (RF) communications device or a microwave communications device, and may include a communications transmitter, a communications receiver, and an antenna or antenna array, which in some embodiments may include a directional antenna. In various embodiments, the wireless communication device may communicate at various frequencies, for example 433 MHz, 900 MHz, 1.2 GHz, or 2.4 GHz. In various embodiments, communications unit 120 may comprise various types of antennas, for example an Adcock antenna array, a quasi-Adcock array using multiple chips and antenna elements, a rotating dish, horn or Yagi antenna, or a steerable phased array antenna.

In some embodiments, communications unit 120 may include one or more communication ports, which may include one or more universal serial bus (USB) ports, firewire ports, CAN-BUS, RS-485, RS-232 and/or RJ-45 ports, and/or bespoke communication interface(s).

As described in greater detail below, in various embodiments communications unit 120 may be employed to facilitate identification and location of electrical receptacle docking stations 105 as mobile robot 100 operates within a particular workspace. In some embodiments, operational data regarding an autonomous operation to be performed by mobile robot 100 may be received by mobile robot 100 via communications unit 120. In some embodiments, this operational data may include work plan data defining a plan of work or tasks to be executed by mobile robot 100, and/or navigation plan data defining a navigation path to be traversed by mobile robot 100 as it performs the assigned tasks. In some embodiments, robot 100 may receive software and/or firmware updates for processor 130 via communication unit 120.

Battery unit 125 is connected to receive power (e.g., AC power) from an electrical receptacle (e.g., electrical receptacle docking station 105) via electrical power cord 114 and its associated plug (see FIG. 3, below). In particular, power converter 126 may be configured to receive electrical power (e.g., AC Mains power) from electrical power cord 114 and to provide DC electrical power to battery 125 and/or other components of mobile robot 100. Power converter 126 may include one or more rectifiers, transformers, switching regulators and/or linear voltage regulators, DC voltage stabilizers, filters, and/or other components as are well known in the art of power conversion. In some embodiments, power converter 126 may comprise a power inverter. Battery unit 125 may supply power for operation of robot 100 when robot 100 is not tethered to an electrical power source via electrical power cord 114. In some embodiments, battery unit 125 may be capable of supplying sufficient power for the operation of processor 130 and the motors which operate wheels 127 for a limited time so that robot 100 may operate and navigate in between times when robot 100 is connected to an electrical receptacle docking stations 105. Battery unit 125 may comprise rechargeable batteries which may be charged by electrical power received via electrical power cord 114 using a battery charger, and optionally a power conditioner, which may be included in battery unit 125.

As noted above, mobile robot 100 may include one or more motors which may operate wheels 127 so that mobile robot 100 may move throughout a workspace. In various embodiments, these motors may be supplied power by battery unit 125 and/or from a tethered connection to electrical receptacle docking station 105 via electrical power cord 114. In some embodiments, these motors may receive power from battery unit 125 alone when mobile robot is not connected to an electrical receptacle docking station 105.

In other embodiments, in addition to or in place of wheels 127, a mobile robot may move via wheels, rollers, continuous tracks, mechanical legs (e.g., a biped, quadruped, hexapod, etc.) or other locomotion means which allow them to navigate within a workspace such as an apartment, a factory, a warehouse, etc.

Processor 130 may control one or more operations of mobile robot 100. In various embodiments, processor 130 may control operations of robot arm 110, communications unit 120, and/or one or more motors which operate wheels 127.

In some alternative embodiments, robot 100 may include a plurality of processors, each of which may control one or more different operations of mobile robot 100. For example, mobile robot 100 may include a first processor for controlling operations of robot arm 110, a second processor for controlling operations of communications unit 120, a third processor for controlling operations of the one or more motors which operate wheels 127, etc. In some embodiments, these processors may communicate with each other and share data to perform their various operations. It should be understood that processing power within mobile robot 100 may be distributed in a variety of manners in different embodiments.

The memory associated with processor 130 may include volatile memory such as random access memory (RAM) and/or non-volatile memory such as read only memory (ROM), programmable read only memory (PROM), FLASH memory, etc.

As described in greater detail below, robot arm 110 and an associated processor (which may be a dedicated processor for robot arm 110, or may be a master processor 130 for robot 100) provide a means for supplying tethered electrical power to mobile robot 100. In particular, in some embodiments robot arm 110 may autonomously: locate a first electrical receptacle docking station 105, navigate towards electrical docking station 105 until electrical docking station 105 is within the work envelope of robot arm 110, employ end effector 116 to plug an electrical plug which is connected to electrical power cord 114 into the first electrical receptacle 105, manage the length of electrical power cord 114 as mobile robot 100 moves about a work area to perform all or a portion of one or more tasks assigned to it while electrical power cord 114 receives electrical power from the first electrical receptacle docking station 105, determine when all or the portion of the one or more tasks assigned to mobile robot 100 which it is possible to complete given the location of the first electrical docking station 105 and maximum length of the electrical power cord 114 has/have been completed, determine that electrical power cord 114 should be connected to a second electrical receptacle docking station 105 in order to complete further portions of the one or more tasks assigned to mobile robot 100, return to the first electrical docking station 105, disconnect electrical plug 116 from electrical docking station 105, locate the second electrical receptacle docking station 105, navigate towards the second electrical docking station 105 until the second electrical docking station 105 is within the work envelope of robot arm 110, employ end effector 116 to plug the electrical plug which is connected to electrical power cord 114 into the second electrical receptacle docking station 105, etc.

Figure 2A:
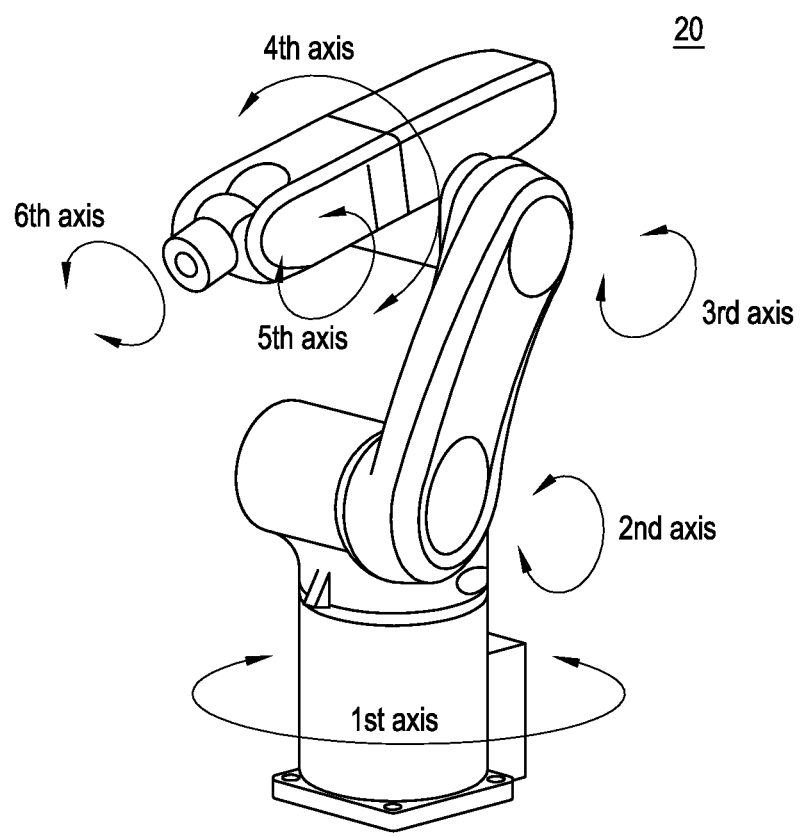
FIG. 2A illustrates a known robot arm.

FIG. 2A illustrates a known robot arm 20. Robot arm 20 is a six axis robot arm, which is a current "gold standard" for industrial robotic arms. Robot arm 20 has six axes of motion, produced by six joints, including three cylindrical axes (e.g., axes 1, 4 & 6) and three revolute axes (e.g. 2, 3 & 5).

Figure 2B:
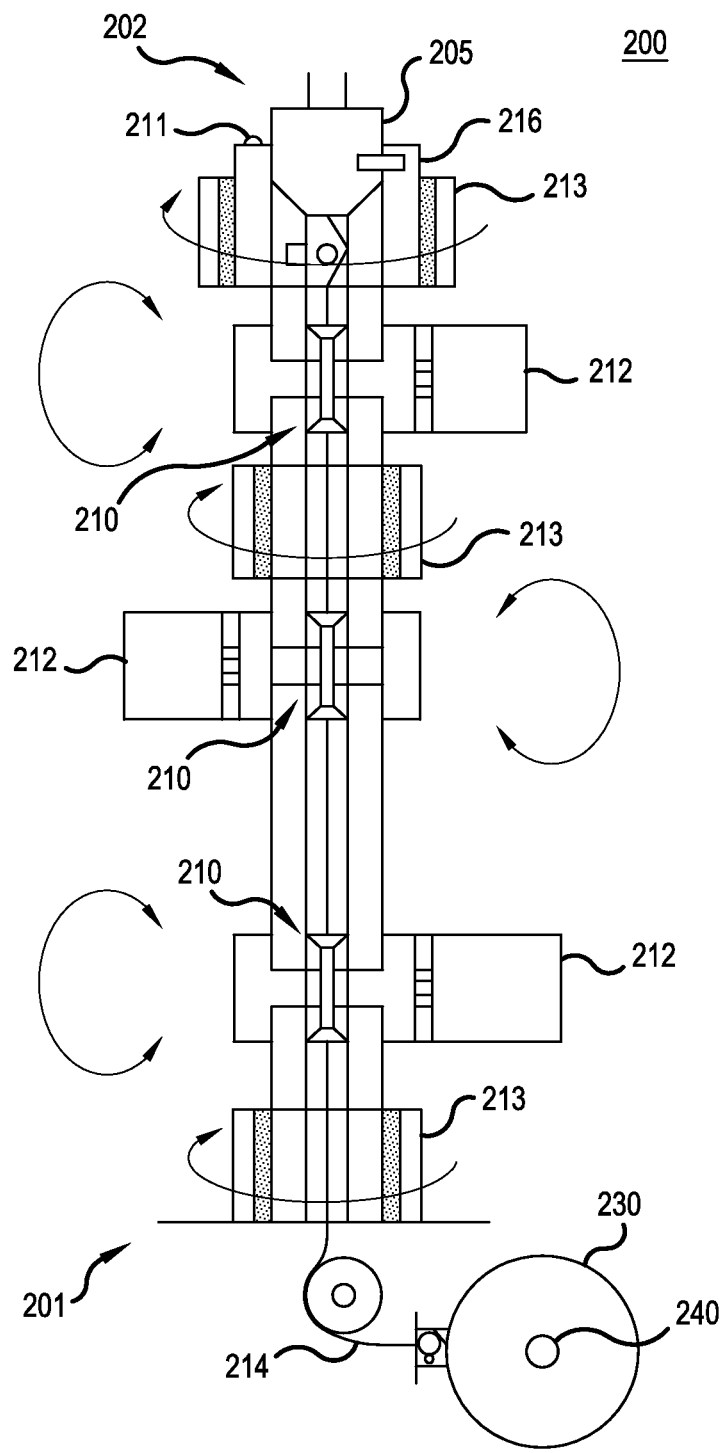
FIG. 2B illustrates an embodiment of a robot arm which dispenses an electrical power cord.

FIG. 2B illustrates an embodiment of a robot arm 200 which may be employed as robot arm 110 for mobile robot 100 in FIG. 1. In various embodiments, robot arm 200 may be mounted at a side of a mobile robot or on top of a mobile robot. Robot arm 200 is a example of a six-axis robot arm, but it should be understood that in other embodiments, robot arms having fewer than six axes may be employed as robot arm 110 for mobile robot 100 in FIG. 1, with possible reductions in complexity and cost as a tradeoff for reduced flexibility.

Robot arm 200 includes three revolute joint motors 212, three cylindrical joint motors 213, end effector 216, one or more pulleys 210, a cable reel 230, and a motor 240 for turning cable reel 230. Beneficially, electrical power cord 214 passes through robot arm 200 from a proximal end 201 thereof to a distal end 202 thereof and includes an electrical plug 205 at the end thereof. In various embodiments, robot arm 200 may be a 4, 5, 6, or 7 axis robotic arm, may be belt-driven, geared, or operated under direct drive, and may operate electrically (e.g., with motors) or hydraulically.

In various embodiments, electrical plug 205 may have a variety of configurations, including two-prong, three-prong, with or without a ground prong, etc.

As illustrated in FIG. 2B, end effector 216 includes one or more sensors 211, examples of which are described in greater detail below with respect to FIG. 3.

In operation, end effector 216 disposed at distal end 202 of robot arm 200 is configured to selectively grasp and release electrical plug 205 so as align and hold electrical plug 205 rigid during insertion into the electrical receptacle (e.g., electrical receptacle docking station 105 of FIG. 1). In some embodiments, end effector 216 is configured to dock electrical plug 205 into an electrical receptacle docking station 105 in response to one or more signals (e.g., one or more acoustic signals) produced by electrical receptacle docking station 105 and received by the one or more sensors 211. In some embodiments, end effector 216 operates in response to a processor (e.g., processor 130) which may control end effector 216 at least in part in response to sensor data which indicates the position and alignment of an electrical receptacle docking station 105 with respect to end effector 216. In some embodiments, end effector 216 operates in response to a processor (e.g., processor 130) which may control end effector 216 using image based visual servoing (IBVMS) algorithms and methods.

Further details of various embodiments of methods and algorithms which may be employed by robot arm 200 for docking and undocking electrical plug 205 to an electrical receptacle docking station 105 will be described in greater detail below.

Motor-driven cable reel 230 is configured to dispense and retract electrical power cord 114 so as to control a length thereof as the mobile robot navigates throughout a workspace, for example according to a navigation plan stored in a memory of the mobile robot. Electrical power cord may be disposed on one or more pulleys 210 as it passes along the length of robot arm 200. In alternative embodiments, electrical power cord 114 may be disposed on one or more sprockets, bushings, idlers or sheaves.

Robot arm 200 may also include one or more cord tensioners which are configured to eliminate slack in the portion of the electrical power cord 114 that at any time is located inside robot arm 200 as it is disposed on one or more pulleys 210.

Further details of various embodiments of methods and algorithms which may be employed by robot arm 200 for managing the length of electrical power cord 214 will be described below.

Figure 3:
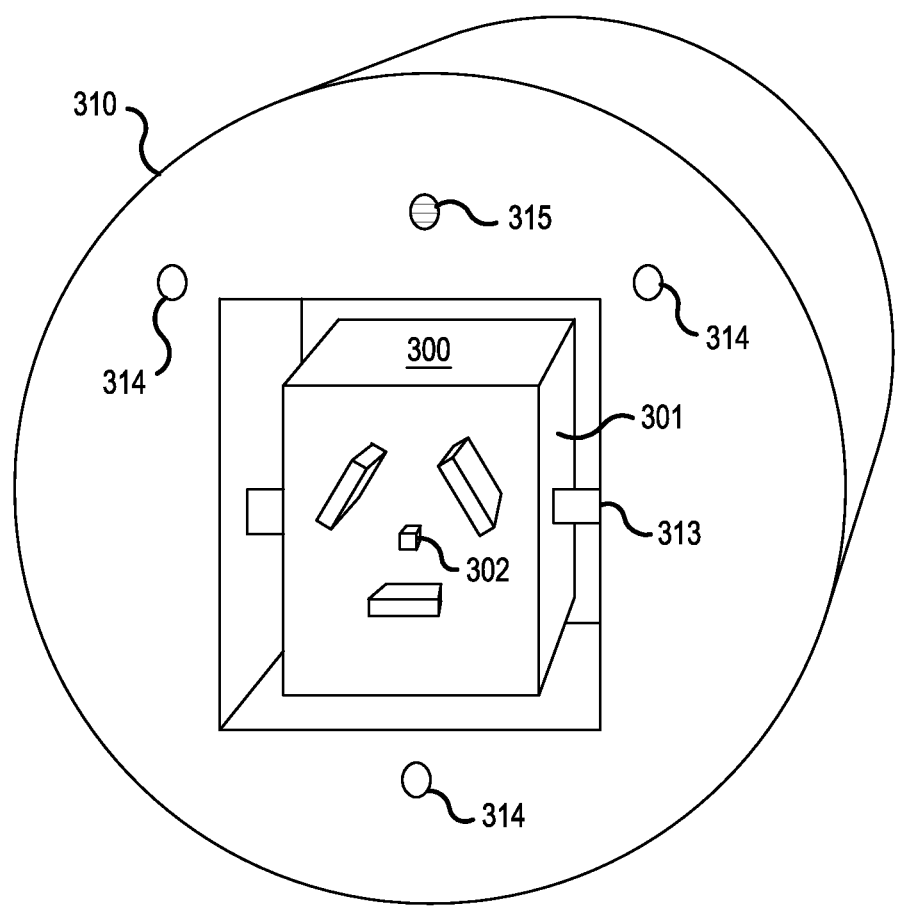
FIG. 3 illustrates an embodiment of an electrical plug for an electrical cord and an end effector of a robot arm for a mobile robot.

FIG. 3 illustrates an embodiment of an electrical plug 300 for an electrical cord, and an end effector 310 of a robot arm for a mobile robot. End effector 310 may be employed as end effector 116 for mobile robot 100 in FIG. 1 and/or as end effector 216 for robot arm 200 in FIG. 2.

As depicted in FIG. 3, electrical plug 300 is modified from a standard electrical plug and includes mating points (e.g., female mating points or sockets) 301 for allowing end effector 310 to grasp and control movement of electrical plug 300. In some embodiments, electrical plug 300 further includes an oversized ground prong (or ground pin) 302 that may be employed to help guide electrical plug 300 into a corresponding ground socket of an electrical receptacle (e.g., electrical receptacle docking station 105) during a process of docking electrical plug 300 with the electrical receptacle. In some embodiments, the ground pin is at least 0.1875" longer than the other pins. In various embodiments, electrical plug 300 may have a variety of configurations, including two-prong, three-prong, with or without a ground prong, etc.

End effector 310 includes a motor controlled mechanism 313, a sensor array 314, and an acoustic transducer 315.

Motor controlled mechanism 313 is controlled in response to one or more control signals generated by a processor (e.g., processor 130) to selectively grasp, move, rotate, and release electrical plug 300 via mating points 301 so as to align and dock electrical plug 300 into an appropriate electrical receptacle (e.g., electrical receptacle docking station 105), and to undock electrical plug 300 from electrical receptacle docking station 105. Further details of various embodiments of methods and algorithms which may be employed by end effector 310 for docking electrical plug 300 into an electrical receptacle docking station 105 and undocking electrical plug 300 from an electrical receptacle docking station 105 will be described below.

It should be understood that motor controlled mechanism 313 and mating points 301 represent an embodiment of an arrangement for end effector 310 to selectively grasp, move, rotate, and release electrical plug 300, but other embodiments are contemplated.

In some embodiments, sensor array 314 may comprise an array of infrared (IR) sensors which are configured to provide sensor data which may be used by a processor (e.g., processor 130) which controls movements of a robot arm (e.g., robot arm 200) which includes end effector 310 so as to properly align and dock electrical plug 300 with the electrical receptacle docking station 105. That is, in these embodiments the sensor data may indicate the position and alignment of an electrical receptacle docking station 105 with respect to end effector 310.

In some embodiments, sensor array 314 may comprise an array of video cameras which are configured to provide data which may be used by a processor (e.g., processor 130) which controls movements of a robot arm (e.g., robot arm 200) which includes end effector 310 so as to properly align and dock electrical plug 300 with the electrical receptacle docking station 105. That is, in these embodiments the camera data may indicate the position and alignment of an electrical receptacle docking station 105 with respect to end effector 310.

In some embodiments, acoustic transducer 315 comprises an ultrasonic microphone/sensor which is configured to receive one or more time-of-flight signals from one or more electrical receptacle docking stations 105 which indicate the location or position of the electrical receptacle docking station(s) 105 with respect to end effector 216. In some embodiments, when a mobile robot operates in a workspace where there are located a plurality of electrical receptacle docking stations 105, the mobile robot may use such time-of-flight signals to determine the relative positions of the various electrical receptacle docking stations 105 and determine which one of the electrical receptacle docking stations 105 the mobile robot should connect to based upon its current location and a navigation plan describing the path it will be travelling next.

In some embodiments, end effector 310 may include a spring-loaded idler wheel type cable tensioner for maintaining the tension on the portion of the electrical power cord 114 that remains inside Robot Arm 200 and has yet to be dispensed.

Figure 4A:
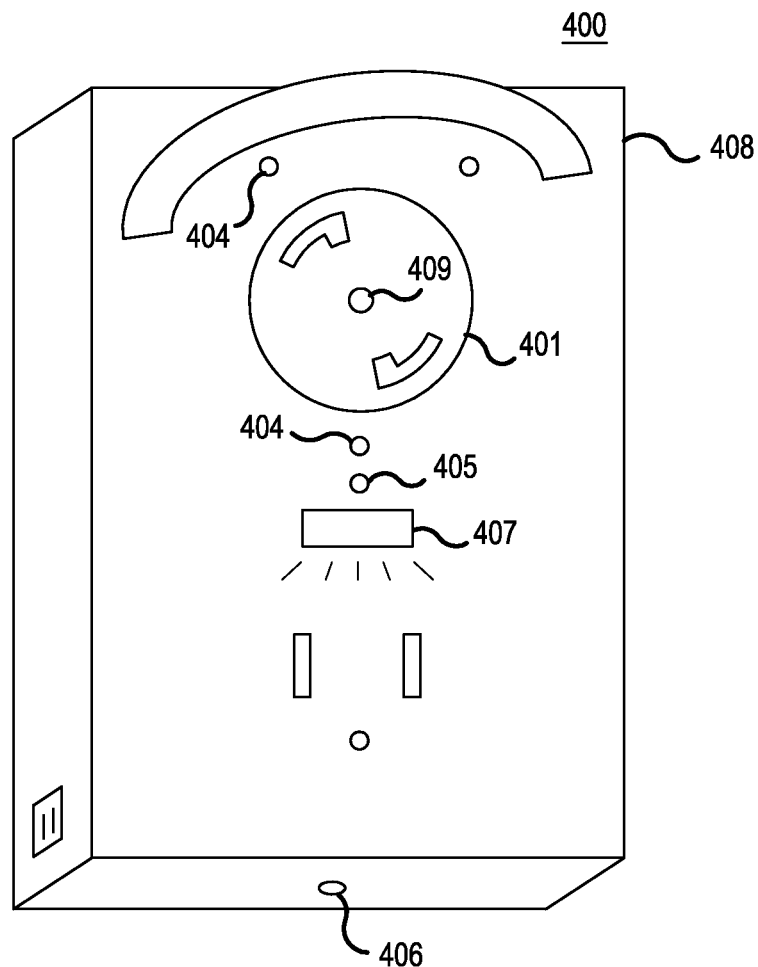
FIGS. 4A-B illustrate an embodiment of an electrical receptacle docking station for supplying power to a mobile robot.
Figure 4B:
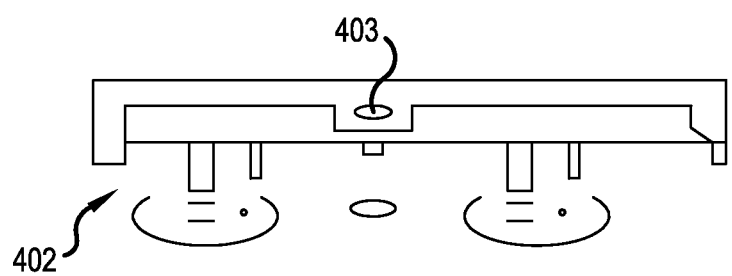

FIGS. 4A-B illustrate an embodiment of an electrical receptacle docking station 400 for supplying power to a mobile robot. Electrical receptacle docking station 400 may be employed as electrical receptacle docking station 105 in the system of FIG. 1. Electrical receptacle docking station 400 includes a locking electrical receptacle 401, electrical prongs 402, a connector 403, a beacon array 404, a first acoustic transducer 405, a second acoustic transducer 406, a wireless transceiver 407, and a light shading structure 408.

In some embodiments, electrical receptacle 401 includes an oversized ground slot or hole 409 in the center thereof that cooperates with a ground prong of an electrical plug to aid the process of docking the electrical plug into electrical receptacle docking station 400. In various embodiments, electrical receptacle 401 may have a variety of configurations, includes two-holes, three-holes, with or without a ground hole, etc.

Electrical prongs 402 are disposed on the rear of a housing of electrical receptacle docking station 400 and allow electrical receptacle docking station 400 to be plugged into, and receive electrical power from, various existing residential, commercial and industrial electrical receptacles (AC Mains power outlets). In some embodiments, receptacle docking station 400 may not have electrical prongs 402 and instead may replace existing electrical outlets by being hardwired into the existing electrical line.

Connector 403 facilitates secure attachment of electrical receptacle docking station 400 to an existing electrical receptacle via the central faceplate screw threads of the existing receptacle. In some embodiments, connector 403 may comprise a screw and a through-hole in the housing of electrical receptacle docking station 105.

Beacon array 404 is configured to generate one or more signals which may be received by a mobile robot and used to dock an electrical plug of the mobile robot with electrical receptacle docking station 400. In some embodiments, beacon array 404 is configured to generate one or more signals which may be received by a sensor array (e.g., sensor array 314) of an end effector (e.g., end effector 310) of a mobile robot arm (e.g., mobile robot arm 200). In some embodiments, beacon array 404 may comprise an array of infrared (IR) transmitters configured to transmit IR beacon signals. In another embodiment, beacon array 404 may comprise an array of transmitters configured to transmit beacon signals in the visible light spectrum. In other embodiments the receptacle docking station may display visual markings which serve as reference points to be used by the sensor array (e.g., sensor array 314) of an end effector (e.g. end effector 310) of a mobile robot arm (e.g., robot arm 200) to facilitate docking with electrical docking station 400.

First acoustic transducer 405 is configured to provide one or more signals which may be received by a mobile robot to measure the distance to electrical receptacle docking station 400. In some embodiments, first acoustic transducer 405 is configured to generate one or more signals which may be received by an acoustic transducer (e.g., acoustic transducer 315) of an end effector (e.g., end effector 310) of a mobile robot arm (e.g., mobile robot arm 200). In some embodiments, acoustic transducer 405 comprises an ultrasonic transducer which is configured to generate one or more time-of-flight signals which indicate the location or position of electrical receptacle docking station 400 with respect to the end effector.

Second acoustic transducer 406 is configured to employ an acoustic signal to measure a distance from the bottom of electrical receptacle docking station 400 to the floor. This information may be communicated from electrical receptacle docking station 400 to a mobile robot and used by the mobile robot to determine the height of the receptacle docking station. In some embodiments, second acoustic transducer 406 comprises an ultrasonic microphone/sensor.

Wireless transceiver 407 is configured to transmit data to a mobile robot, for example to communications unit 120 of mobile robot 100.

Light shading structure 408 is configured to provide shading from ambient light for the IR or visible light beacons from beacon array 404.

Although not shown in FIG. 4, in some embodiments electrical receptacle docking station 400 may further include a processor and memory for controlling operations of electrical receptacle docking station 400, for example operations of beacon array 404, first acoustic transducer 405, second acoustic transducer 406, and/or wireless transceiver 407. In some embodiments, electrical receptacle docking station 400 may further include one or more connectors (e.g., a USB connector) which may be used, for example, to program a processor in electrical receptacle docking station 400, or to communicate data with electrical receptacle docking station 400.

In some embodiments, electrical receptacle docking station 400 may supply AC power to locking electrical receptacle 401 in the same format (i.e., voltage level and frequency) as it receives AC power from AC Mains via electrical prongs 402. In other embodiments, electrical receptacle docking station 400 may include a power converting and/or conditioning circuit for transforming the electrical power received from AC Mains via electrical prongs 402 into a different format which the mobile robot is designed to receive. For example, in some embodiments electrical receptacle docking station 400 may output electrical power at a different voltage level and/or frequency than the electrical power which it received, and/or may convert the electrical power from AC to DC. In some embodiments, electrical receptacle docking station 400 may operate as a charger for a battery unit (e.g., battery unit 125) of a mobile robot.

FIG. 5 illustrates an embodiment of a mobile robot 500 which is receiving electrical power from an electrical receptacle docking station 505 while moving about a room 50. As illustrated in FIG. 5, mobile robot 500 includes robot arm 510 having end effector 516, and an electrical power cord 514 having an electrical plug 506 at an end thereof. As illustrated in FIG. 5, electrical plug 506 is docked with electrical receptacle docking station 505 while mobile robot 500 moves about room 50, and supplies electrical power to mobile robot 500 via electrical power cord 514.

Figure 6:
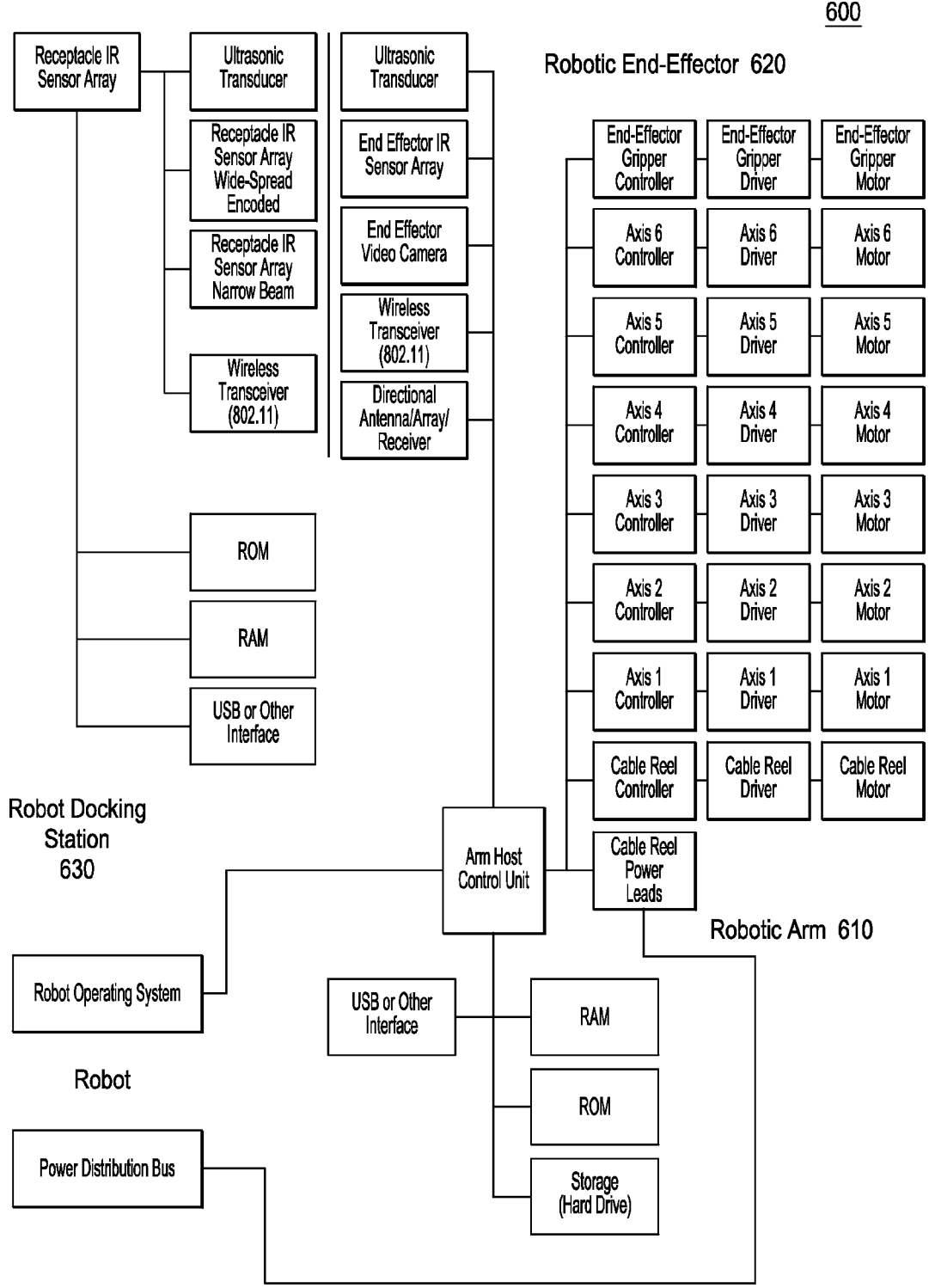
FIG. 6 shows a component breakdown for one embodiment of a system for supplying tethered electrical power to a mobile robot.

FIG. 6 shows a component breakdown for one embodiment of a system 600 for supplying tethered electrical power to a mobile robot. System 600 may be one embodiment of system 10 illustrated in FIG. 1. As illustrated in FIG. 6, system 600 includes a robot arm 610, an end effector 620, and an electrical receptacle docking station 630. In some embodiments, robot arm may comprise robot arm 110 of FIG. 1 and robot arm 200 illustrated in FIG. 2, end effector 620 may comprise end effector 116 of FIG. 1, end effector 216 of FIG. 2, and end effector 310 of FIG. 3, and electrical receptacle docking station 630 may comprise electrical receptacle docking station 105 of FIG. 1 and electrical receptacle docking station 400 of FIG. 4. The component breakdown listed in FIG. 6 is self-explanatory and will not be repeated here in the interest of brevity. In other embodiments, robotic arm 610 may have as few as one controller (alternatively called indexers) for eight stepper motors and as few as one driver to generate the electrical pulse train for all eight stepper motors. Alternatively, the controller and pulse driver functions and circuitry could be combined onto one device, and in another embodiment, the axis controllers and drivers could all be integrated into the arm control unit. In some embodiments, the motors may comprise variable reductance, permanent magnet, or hybrid motors. In some embodiments, the drivers may utilize pulse width modulation (PWM) to control the motors, and operate in half-step or micro-step mode. In other embodiments, the Driver may be an L/R (Inductance/Resistance) type. In another embodiment, the controllers, of which there may be as few as one control encoders, of which there may be as few as one, which control servo motors. In another embodiment, there may be a mix of servo and stepper motors.

Figure 7:
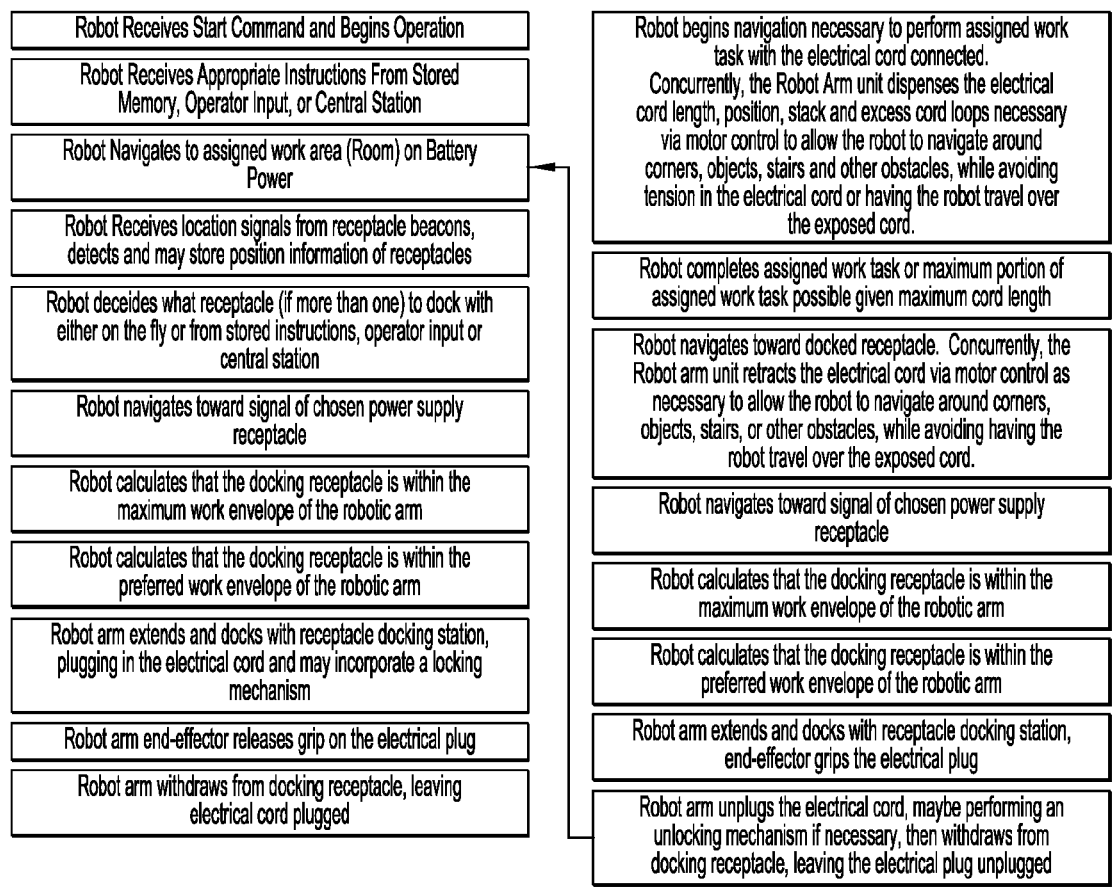
FIG. 7 illustrates a sequence of steps for an example operation of an autonomous mobile robot which receives electrical power from a tethered connection to an electrical receptacle.

FIG. 7 illustrates a sequence of steps for an example operation 700 of an autonomous mobile robot which receives electrical power from a tethered connection to an electrical receptacle. In particular, FIG. 7 illustrates an operation 700 wherein the autonomous mobile robot moves throughout a workspace according to a navigation plan to perform assigned work tasks, docking and undocking with various electrical receptacle docking stations as necessary as determined by the maximum length of the electrical power cord of the mobile robot. In some embodiments, the autonomous mobile robot may be mobile robot 100 of FIG. 1 and mobile robot 500 of FIG. 5. The detailed steps of operation 700 as shown in FIG. 7 are self-explanatory and will not be repeated here in the interest of brevity.

Figure 8:
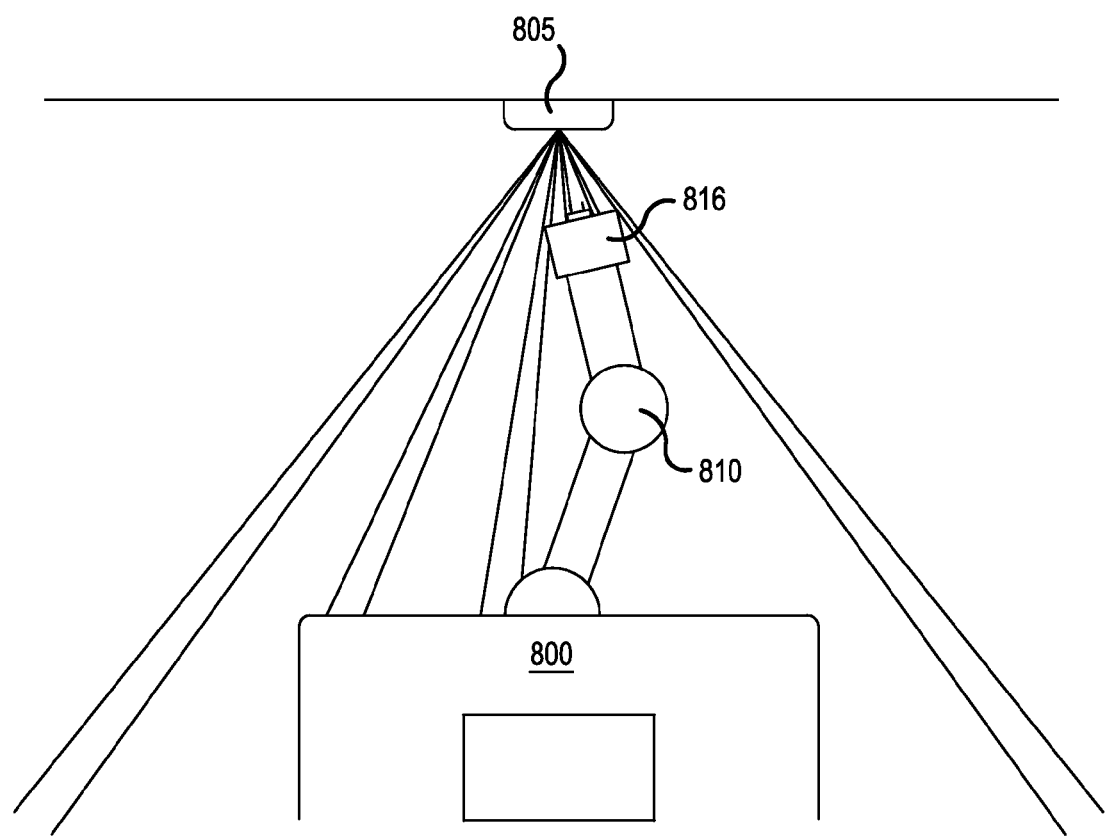
FIG. 8 is a drawing for explaining one embodiment of a method of docking an electrical power cord of an autonomous mobile robot with an electrical receptacle.

FIG. 8 is a drawing for explaining one embodiment of a method of docking an electrical power cord of an autonomous mobile robot with an electrical receptacle. FIG. 8 depicts an electrical receptacle docking station 805 (e.g., electrical receptacle docking station 105 of FIG. 1 and electrical receptacle docking station 400 of FIG. 4 and electrical receptacle docking station 630 of FIG. 6) which transmits a plurality of beams or signals (e.g., eight beams), which may be infrared signals, spanning a space or room 80.

FIG. 8 also depicts a mobile robot 800 (e.g., mobile robot 100 of FIG. 1, mobile robot 500 of FIG. 5, and mobile robot 600 of FIG. 6) which receives one or more of the beams or signals from electrical receptacle docking station 805. In some embodiments the signals may be encoded with data which may be employed by mobile robot to determine the relative location of electrical receptacle docking station 805. Mobile robot 800 may navigate toward electrical receptacle docking station 805 (for example, using a map of locations of electrical docking stations 805 stored in a memory device of mobile robot 800) so as to dock an electrical plug with electrical receptacle docking station 805 for receiving electrical power from electrical receptacle docking station 805. At some point as mobile robot 800 moves toward electrical receptacle docking station 805, mobile robot 800 may extend its robot arm 810, and its associated end effector 816, toward electrical receptacle docking station 805. As end effector 816 approaches electrical receptacle docking station 805, a sensor array, camera array and/or ultrasonic transducer may be employed to determine the precise positioning and alignment of the electrical receptacle docking station 805 so as to dock an electrical plug therewith.

In an alternative embodiment, instead of employing multiple beams or signals, electrical receptacle docking station 805 may sweep a single beam across the room or space 80.

Figure 9:
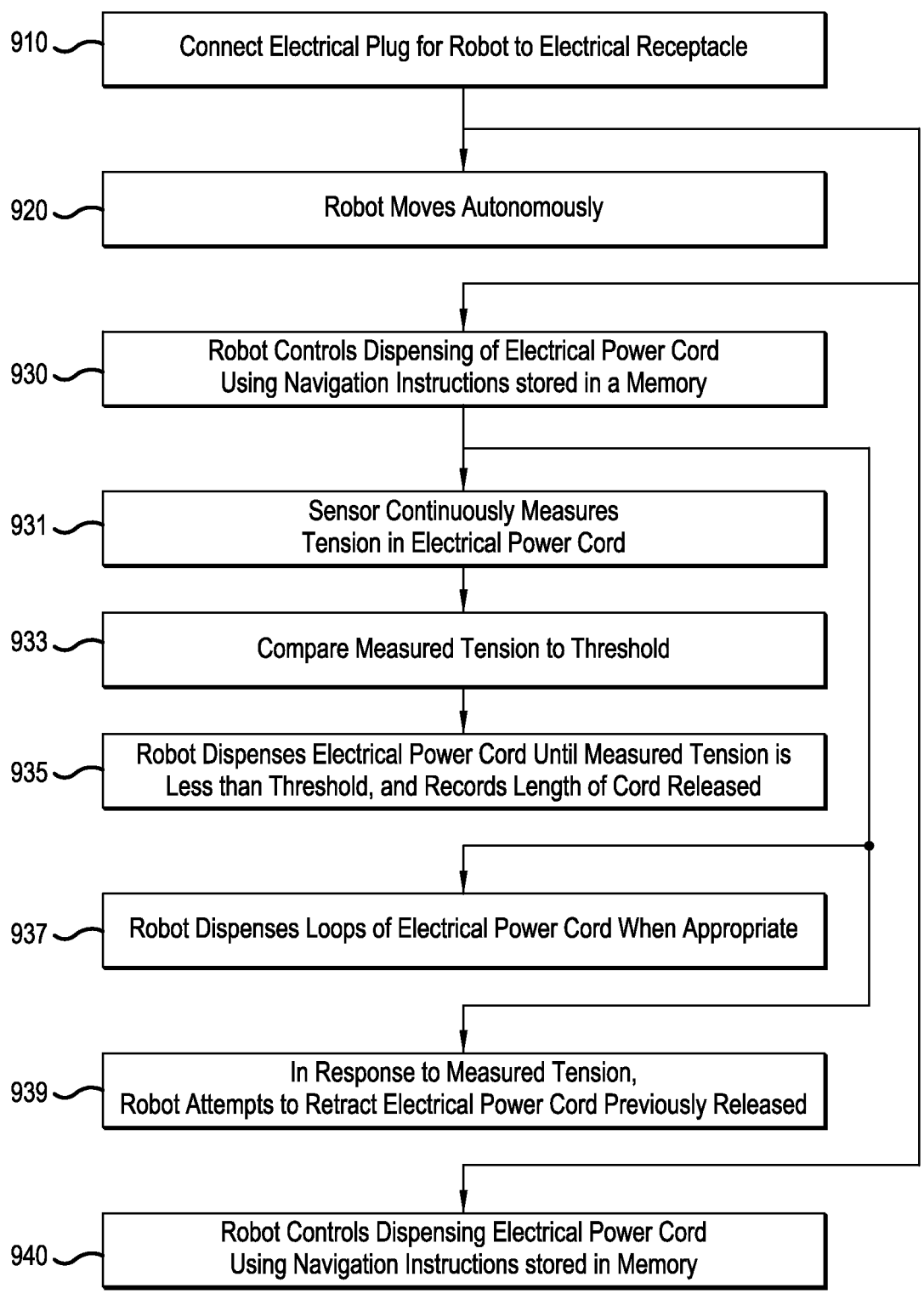
FIG. 9 is a flowchart of one embodiment of a method of navigation by an autonomous mobile robot which receives electrical power from a tethered connection to an electrical receptacle.

FIG. 9 is a flowchart of one embodiment of a method 900 of navigation of a given area, such as a room or workspace, by an autonomous mobile robot which receives electrical power from a tethered connection to an electrical receptacle and possesses a safety mechanism designed to release cord in response to a sudden and unexpected pull, and retract that the release electrical power cord after a specified time interval.

In an operation 910, a mobile robot connects an electrical plug to an electrical receptacle, for example an electrical receptacle docking station, in a room or workspace where the mobile robot is to perform one or more tasks. The connection may be made via a robot arm having an end effector as described in greater detail above.

In an operation 920, the mobile robot moves autonomously through the room or work space, performing its assigned tasks, while receiving tethered electrical power from the electrical receptacle docking station. In various embodiments, the mobile robot may move via wheels, rollers, continuous tracks, mechanical legs (e.g., a biped, quadruped, hexapod, etc.) or other locomotion means which allow them to navigate within a workspace such as an apartment, a factory, a warehouse, etc.

While the mobile robot moves autonomously through the room or work space, in a parallel operation 930 the mobile robot, and more specifically a robot arm of the mobile robot, controls the dispensing of the electrical power cord according to an algorithm executed by a processor of the mobile robot and/or robot arm in accordance with instructions stored in a memory device associated with the processor. In response to the algorithm, the processor may control operations of a cable reel and/or one or more cord tensioners via one or more control signals.

In some embodiments, the robot arm controls a length of electrical power cord which is dispensed by employing odometry data of the mobile robot and/or robot arm, and optionally dimensional parameters for the mobile robot and/or the electrical receptacle docking station.

In various embodiments, the odometry data may include one or both of: the net length of a path that the mobile robot has traveled away from the electrical receptacle into which the electrical power cord is docked, and net degrees of rotation of the mobile robot from its rotational position at the time when the electrical power cord was initially docked into the electrical receptacle.

In various embodiments, the dimensional parameters for the mobile robot and/or the electrical receptacle docking station may include one or more of: the height of the electrical receptacle; the height of the location at the distal end of the robot arm from which the electrical cord is dispensed; and an extension length of the robot arm.

Operation 930 may be performed using a variety of different algorithms. In one embodiment, operation 930 includes a plurality of sub-operations, including sub-operations 931, 933, 935 and 937.

In sub-operation 931, a sensor is used to continuously measure tension on the electrical power cord. In some embodiments, this data may be sent to a processor of the mobile robot and/or robot arm.

In sub-operation 933, the measured tension is compared to a threshold. In some embodiments, the threshold may be at or near zero tension.

In response to a sudden pull on the electrical power cord that results in raising the tension in the electrical power cord above the threshold, in sub-operation 935 the mobile robot, and particularly the robot arm, dispenses electrical power cord until the tension is less than the threshold, and records the length of electrical power cord dispensed. In some embodiments, this data is sent to a processor of the mobile robot and/or arm which executes a routine or algorithm for managing dispensation of the electrical power cord from the robot arm.

In an optional sub-operation 937, in some embodiments the mobile robot, and particularly the robot arm, is configured to dispense one or more loops of electrical power cord in response to specific events which may occur as the mobile robot traverse the room or work space. In some embodiments, each loop may have a circumference or length of between 4 and 36 inches. In some embodiments, one or more loops are dispersed at some or all occasions where the robot makes a turn of 90 degrees or more. Some embodiments may omit sub-operation 937.

In sub-operation 939, when the tension is less than the threshold by a specified amount, then the mobile robot, and particularly the robot arm, retracts a portion of the recorded length of electrical power cord which has previously been dispensed as long as the tension measured remains within the specified amount of the threshold.

The mobile robot then continues to move autonomously through the room or work space, and while the mobile robot/robot arm controls the length of the electrical power cord, in a parallel operation 940 the mobile robot, and more specifically a robot arm of the mobile robot, controls the dispensing of electrical power cord according to an algorithm executed by a processor of the mobile robot and/or robot arm in accordance with instructions stored in a memory device associated with the processor. In response to the algorithm, the processor may control operations of a cable reel and/or one or more cord tensioners via one or more control signals.

Here, when we refer a rate of dispensing electrical power cord, it is understood that this rate includes retracting or "negatively dispensing" electrical power cord when appropriate so as to shorten the total length of dispensed electrical power cord. That is, the rate of dispensation at times may be negative.

To illustrate one concrete example of method 900, in one embodiment a mobile robot may calculate the length of the electrical power cord as described below.

Let the total length of electrical power cord which has been dispensed from the cable reel at time $t = C_T(t)$; the length of dispensed electrical power cord which is disposed outside the robot arm = $C_O(t)$; and the length of electrical power cord which is disposed inside the robot arm at time $t = C_I(t)$. Then:

$$C_T(t) = S^* C_O(t) + C_I(t) \quad (1)$$

where S is a "sag coefficient" related to an amount of sag in the electrical power which is disposed inside the robot arm. As an example, in some embodiments, S may be about 10% (e.g., between 5% and 15%).

Accordingly, the total length of electrical power cord which has been dispensed from the cable reel at time t, $C_T(t)$, may be determined from the length of dispensed electrical power cord which is disposed outside the robot arm = $C_O(t)$, and the length of electrical power cord which is disposed inside the robot arm, $C_I(t)$.

The length of dispensed electrical power cord which is disposed outside the robot arm, $C_O(t)$, may also be referred to as the length of the electrical power cord which has been dispensed from the end effector of the robot arm, and in on embodiment may be determined as follows.

Let: L be the length of the linear path traveled by the mobile robot away from the electrical receptacle into which the electrical power cord is plugged; H be the height of the electrical receptacle above the floor or surface on which the mobile robot navigates; F be the height of the robot effector above the floor or surface on which the mobile robot navigates; A be the length of the robot arm when extended to dock with the electrical docking receptacle 105; ω be the degrees of net rotation measured from the time of docking; R be the radius of the end effector of the robot arm from the central rotational axis of the robot; Θ be the length of electrical power cord required for rotational movement of robot, where $\Theta = \omega/360 (2\pi r)$; N be the number of loops of electrical power cord which have been dispensed; and P be the length of each loop of the electrical power card. Here, P is typically between 4 and 36 inches, which will vary based on the specifics of the electrical power cord used—wire type, material, gauge, and electrical power cord sheath stiffness—related to materials selected for a given operating environment. For example, a 480 volt electrical power cord with chemical resistance to petrochemicals requiring a butyl electrical power cord sheath which has a high stiffness may require 30 inch loops.

With these definitions, consider a situation at time t=0, where the robot arm has docked with an electrical receptacle docking station, the robot arm is retracted, but the robot has not yet moved (this corresponds to FIG. 13, State 2, as discussed below). In that case, the electrical power cord length at time=t would be:

$$C_O(t) = (L(t) + H + F + \Theta(t) + N(t))^* P \quad (2)$$

and at time t=0:

$$C_O(0) = (L(0) + H + F + A + \Theta(0) + N(0))^* P(s) \quad (3)$$

Figure 10:
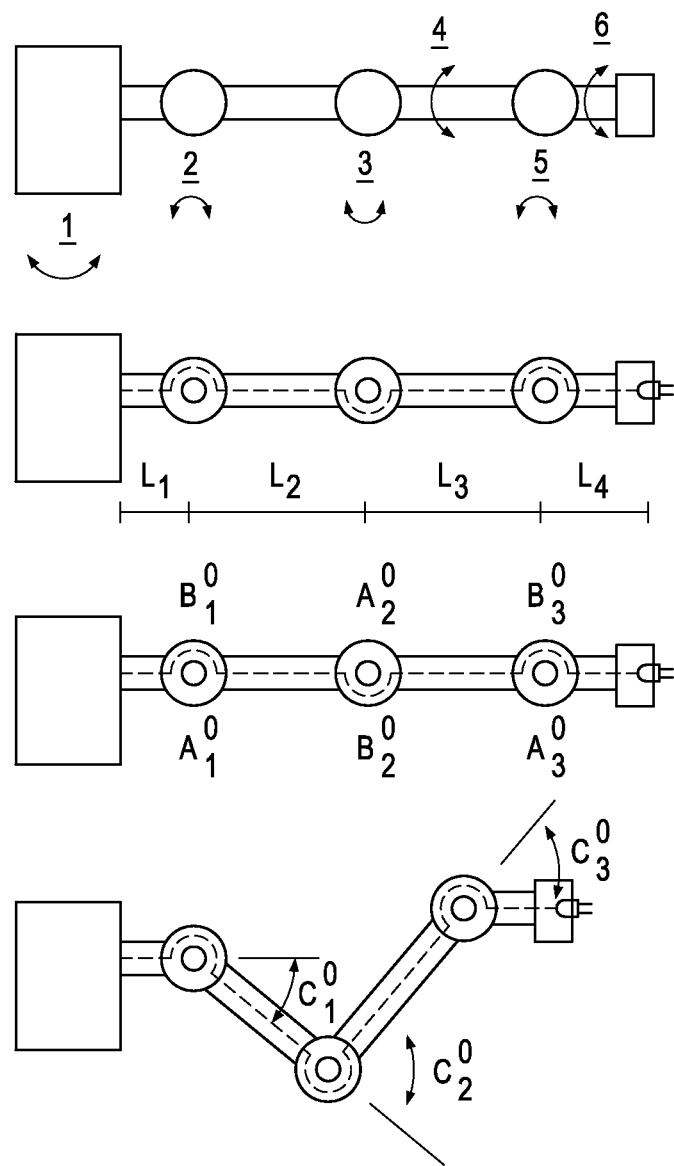
FIG. 10 is a flowchart of another embodiment of a method of navigation by an autonomous mobile robot which receives electrical power from a tethered connection to an electrical receptacle.

Meanwhile, reference is made to FIG. 10 to explain an example embodiment of a method for determining the length of electrical power cord which is disposed inside the robot arm at time $t = C_I(t)$.

In the example embodiment, the robot arm is a six-axis robot arm such as the robot arm 20 illustrated in FIG. 2A, and includes six axes of motion from six joints, three of which are cylindrical in nature (axes 1, 4 and 6 in FIG. 2A), and three of which are revolute in nature (axes 2, 3 and 5 in FIG. 2A).

When not connected to an electrical docking receptacle, the electrical power cord can be thought of as being fixed at two points: at the end effector, and at the cable reel. As the robot arm moves around inside its work envelope, the length of electrical power cord released from the cable reel will need to change based on the relative angles of the revolute joints of the robot arm. In any concrete implementation, the actual calculation will be dependent upon variables, including: the structure of the arm (Top mount, side mount, elbow bends up, elbow bends down); the radii of the pulley, bearing, sheave, or sprocket used to dispense the electrical power cord; the routing method of the electrical power cord through the pulleys of the robot arm; and the stiffness of the electrical power cord.

In general, the length of the electrical power cord which is disposed inside the robot arm at time $t = C_I(t)$ will be shortest when the relative angles of the revolute joints are at 180 degrees (i.e., the robot arm is straight), and will be longest when the robot arm is bent.

Let L1, L2, L3 & L4, comprise the length of each arm section of the robot arm as illustrated in FIG. 10. As illustrated in FIG. 10, for each revolute axis (e.g., axes 2, 3 & 5), let A correspond to the inside angle, and B correspond to the outside angle with respect to electrical power cord travel through the robot arm and around the pulleys. Here, $A + C = 180°$. For each revolute axis, let the variable R represent the radius of a corresponding pulley, assuming that the center of the pulley is also the center of the revolute joint axis.

In that case, the length of the electrical power cord which is disposed inside the robot arm at time $t = C_I(t)$ can be found as:

$$C_I(t) = L1 + [(180° - A1)(t)/360°)(2\pi R1)] + L2 + [(180° - A2(t)/360°)(2\pi R2)] + L3 + [(180° - A3(t)/360°)(2\pi R3)] + L4 \quad (4)$$

Figure 11:
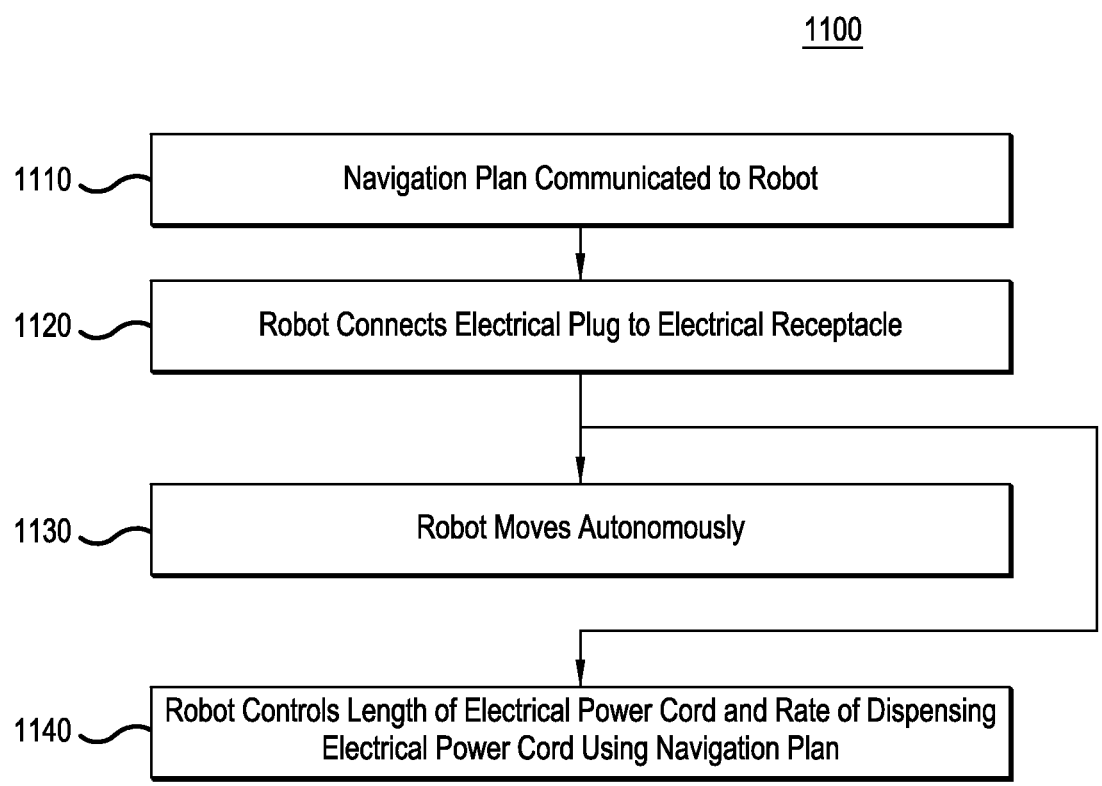
FIG. 11 is a drawing for explaining an example navigation of an autonomous mobile robot which receives electrical power from a tethered connection to an electrical receptacle.

FIG. 11 is a flowchart of another embodiment of a method 1100 of navigation by an autonomous mobile robot which receives electrical power from a tethered connection to an electrical receptacle. In particular, method 1100 represents an example embodiment of a method whereby a mobile robot navigates throughout a given area such as a room or workspace according to a navigation plan.

In a first step 1110, the navigation plan is communicated to the mobile robot. The navigation plan may be represented by navigation instructions which may be stored in a memory device in the mobile robot and accessed by a processor which controls one or more operations of the mobile robot. In some embodiments, the navigation instructions may be communicated to the mobile robot via a communications device of the mobile robot. Such communication may be done wirelessly or via a wired connection.

In some embodiments, the navigation instructions are configured to cause one or more processors of the mobile robot to actuate one or more motors of the mobile robot which move the mobile robot with respect to some fixed point in relation to the electrical receptacle during at least one of a discrete time interval and an event interval. Here, an event is an action or occurrence detected by a program running on a processor of the mobile robot, and may include inputs from hardware such as sensors and communication devices, as well as software instructions, messages and returned values from program subroutines.

In a step 1120, the mobile robot connects an electrical plug of an electrical power cord of the mobile robot to an electrical receptacle, for example an electrical receptacle docking station, in a room or workspace where the mobile robot is to perform one or more tasks. The connection may be made via a robot arm having an end effector as described in greater detail above.

In a step 1130, the mobile robot moves autonomously through the room or work space, performing its assigned tasks, while receiving tethered electrical power from the electrical receptacle docking station. In various embodiments, the mobile robot may move via wheels, rollers, continuous tracks, mechanical legs (e.g., a biped, quadruped, hexapod, etc.) or other locomotion means which allow them to navigate within a workspace such as an apartment, a factory, a warehouse, etc.

In a step 1140, the mobile robot controls the length of an electrical power cord which it dispenses, and the rate of dispensing the electrical power cord, according to the navigation plan, using the instructions stored in a memory device in the mobile robot.

FIG. 12 is a drawing for explaining an example navigation of an autonomous mobile robot which receives electrical power from a tethered connection to an electrical receptacle. In particular, FIG. 12 illustrates a room or workspace 1200 which three specific locations labeled by corresponding coordinates (0, 0), (X, 0) and (X, Y).

Figure 13:
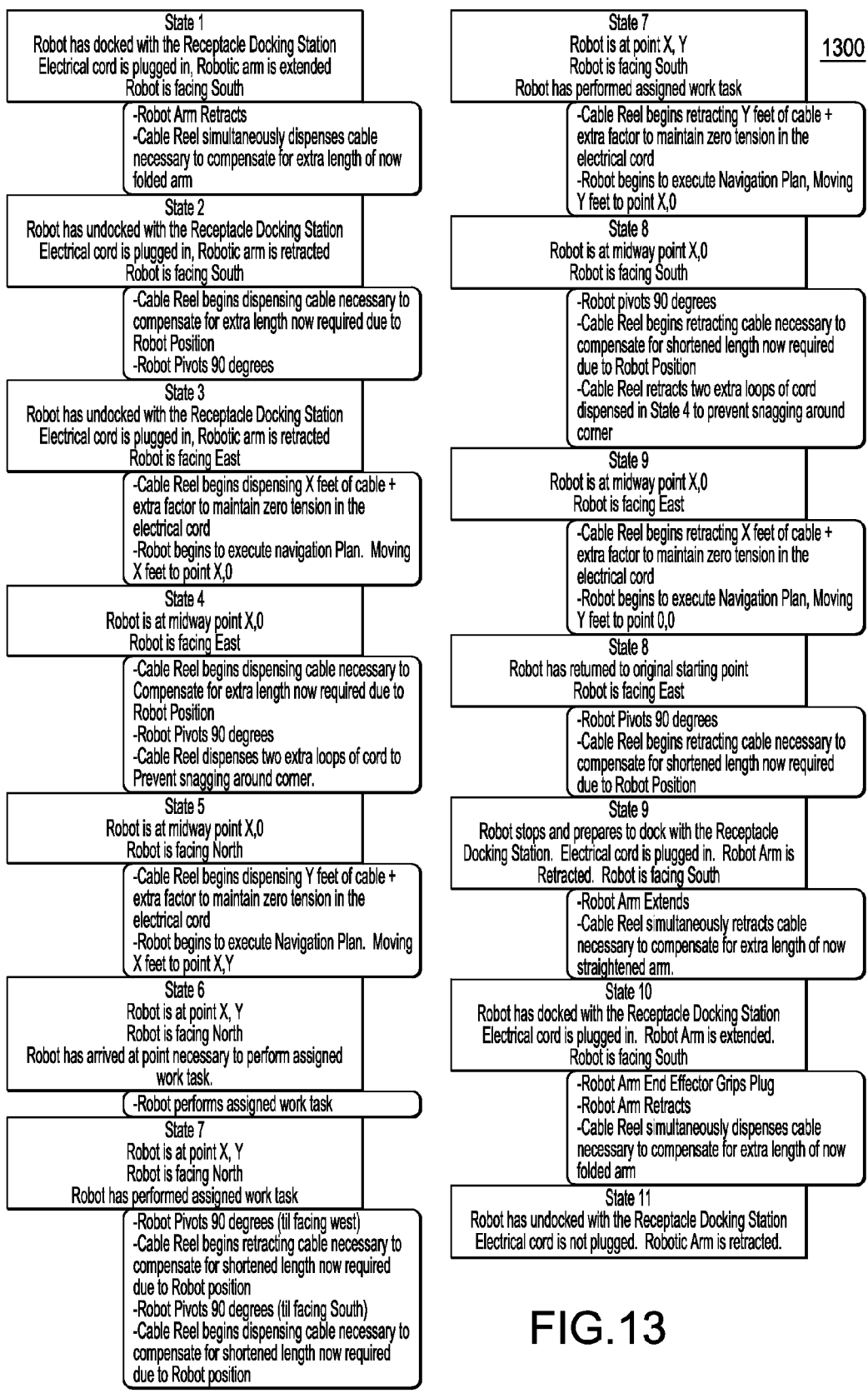
FIG. 13 illustrates a sequence of steps in an example navigation operation of an autonomous mobile robot which receives electrical power from a tethered connection to an electrical receptacle and navigates a room or workspace.

FIG. 13 illustrates a sequence of steps in an example navigation operation 1300 of an autonomous mobile robot which receives electrical power from a tethered connection to an electrical receptacle and navigates the room or workspace 1200. The detailed steps of operation 1300 as shown in FIG. 13 are self-explanatory and will not be repeated here in the interest of brevity.

In the descriptions to follow, the following definitions will be employed.

Process.

A process is a container for a set of resources used when executing an instance of a computer program. It comprises:

Allocated memory space;

An executable program, which defines initial code and data that is mapped into the memory space allocated for the process;

A list of descriptors to various system resources such as semaphores, communication ports, files, etc (in UNIX terminology, these are known as descriptors, while in WINDOWS systems, these are called handles);

A unique ID.

Node (Software).

A node is a process executed in a distributed computing environment.

Inter-Process Communication (IPC).

Inter-process communication (IPC) mechanisms enable processes to exchange data and synchronize execution. IPC may also be referred to as inter-thread communication. The main IPC methods are: message queue, signals, socket, pipe, named pipe, semaphore, and shared memory. In addition to IPC, POSIX threads have the following methods for synchronization: mutual exclusion (mutex) locks, condition variables, and read-write locks. Other forms of IPC include Java Remote Method Invocation (RMI), Common Object Request Broker Architecture (CORBA), Message Passing interface (MPI), QNX, Microsoft Message Queuing (MSMQ), XML-RPC, ONC-RPC, Synchronous Interprocess Messaging Project for Linux (SIMPL), Solaris Doors, and Windows Local Procedure Calls.

Synchronous Messaging.

A synchronous computing operation blocks a given process until a given operation completes. In the case of a message, both the send and receive operations complete when the sending process receives confirmation that the message has been delivered to the receiver. An example would be the case of remote procedure call, wherein the send, receive, and reply operations complete when the reception confirmation (the reply) has been delivered to the sender. Synchronous message passing systems require the sender and receiver to wait for each other to transfer the message. That is, the sending object will not continue until is has received confirmation that the receiving object has received the message.

Asynchronous Messaging.

An asynchronous computing operation is non-blocking and only initiates the operation. Asynchronous message passing allows more parallelism. Since a process does not block, it can continue to perform other operations while the message is in transit. In the case of receiving, this means a process can express its interest in receiving messages on multiple ports simultaneously. Asynchronous message passing systems deliver a message from sender to receiver, without waiting for the receiver to be ready. The advantage of asynchronous communication is that the sender and receiver can overlap their computing operations because they do not wait for each other.

Request-Reply Message Pattern.

The request-reply message pattern connects a set of clients to a set of services. Typically implemented in a synchronous fashion, for one-to-one communication between computer processes or applications Publish-Subscribe Message Pattern.

The publish-subscribe message pattern connects a set of publishers to a set of subscribers. This is a one-to-many data distribution pattern, typically implemented in an asynchronous fashion.

With these definitions and understanding in mind, we now discuss embodiments of computing architectures for autonomous mobile robots.

There exist a large variety of computing architecture possibilities for mobile robotics platforms. On one end of the spectrum there is the single processor architecture, as shown in fig x, which very similar to a personal computer, wherein the various parts of the robot are treated as devices and controlled by device drivers via an I/O manager. Moving on the spectrum from single to distributed computing architectures, we can imagine a computing cluster comprising a master "hardware node", and a number of slave hardware nodes, each hardware node consisting of a processor with attached memory, the architecture communicating via a single system image middleware, as shown in Fig. X. On the far end of the distributed system spectrum we encounter a system of multiple peer hardware nodes, again tied together by middleware software that distributes computational tasks among the multiple processors. In both distributed computing configurations, it is likely that the middleware would be constructed in such a way as to provide a single system image, by abstracting the hardware details away to let the programmer focus on the software in isolation.

Regardless of the details pertaining to a specific embodiment, the length of electrical power cord released by the motorized cable reel, which is attached to a robot, may be calculated in advance by at least one process that directly receives information from those computing processes that comprise the robot navigation instructions, via a variety of messaging patterns and protocols that in various embodiments may include IPC mechanisms, and then by the operation of various algorithms, which in some embodiments include preconfigured data, to calculate the electrical power cord length to be dispensed and the rate of dispensation in advance and then dispense/retract the electrical power cord in perfect synchronization with the movement of the robot.

In any robot navigation system, there will be a number of running processes, being executed on either a single processor, or distributed among multiple processors.

Figure 14:
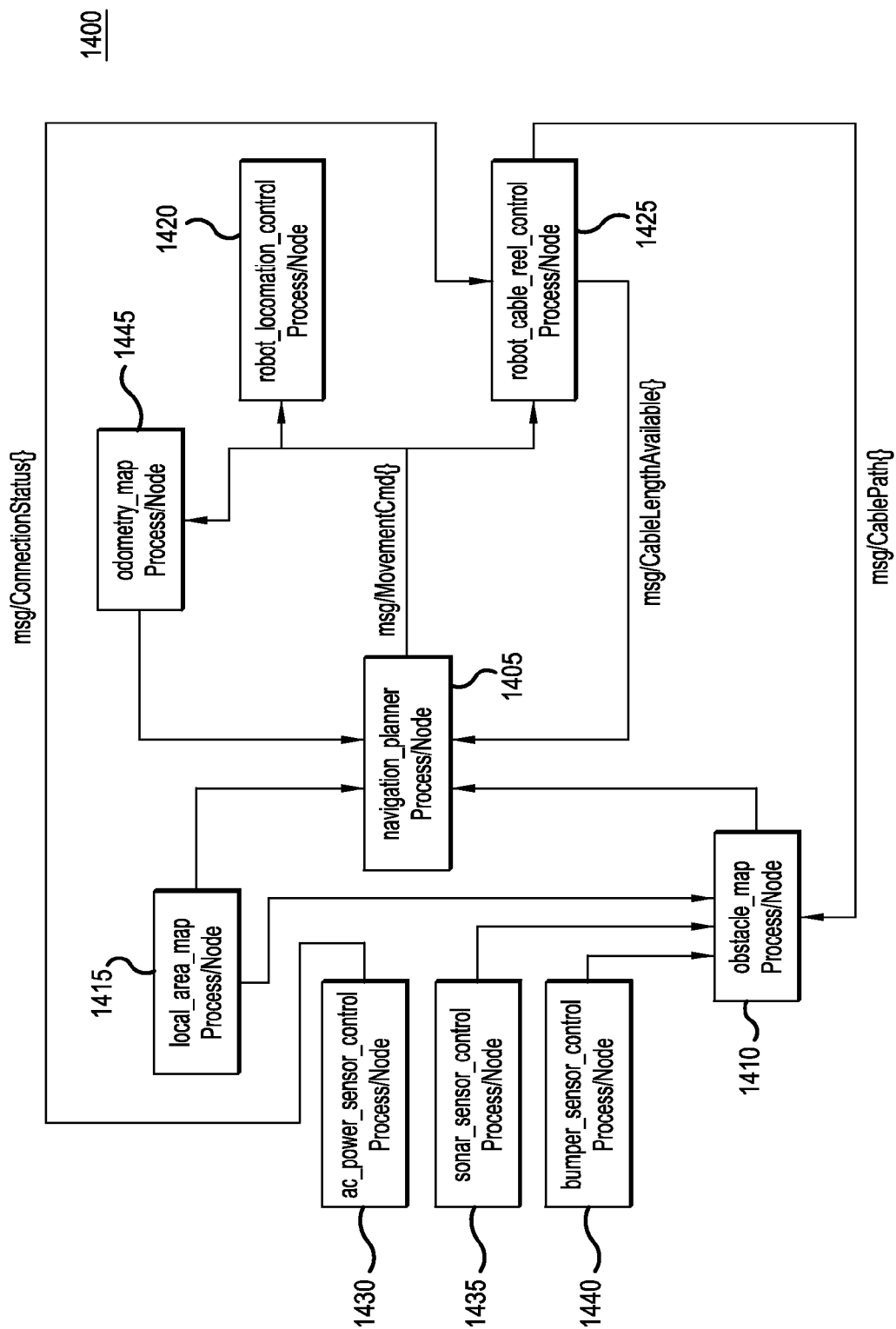
FIG. 14 illustrates relevant components of an example process stack for one embodiment of a processor-controlled navigation system for an autonomous mobile robot.

FIG. 14, which illustrates relevant components of an example process stack 1400 for one embodiment of a processor-controlled navigation system for an autonomous mobile robot. In this embodiment, all communication between the processes shown consists of asynchronous messages broadcast in a publish-subscribe message pattern. As illustrated in FIG. 14, a navigation_planner process 1405 receives messages published by obstacle_map process 1410, local_area_map process 1420 and odometry_map process 1445, and subsequently publishes movement commands that are subscribed to by robot_locomotion_control and robot_cable_reel_control processes 1420 and 1425, respectively. Robot_locomotion_control 1420 process performs the calculations necessary to transmit the movement commands into electrical pulses necessary to drive the electric motors used for locomotion of the autonomous mobile robot. If an ac_power_sensor_control process 1430 messages a value of True, in a "Connection Status" message, which is subscribed to by robot_cable_reel_control process, 1425 then robot_cable_reel_control process 1425 will subscribe to the same movement command message as received by robot_locomotion_control process 1420. Then, robot_cable_reel_control process 1425 will calculate the length of electrical power cord that needs to be dispensed and the rate at which it needs to be dispensed based on the anticipated movement engendered by robot_locomotion_control process 1420. Then, robot_cable_reel_control process 1425 will perform the calculations necessary to transmit the dispensation rate into electrical pulses which will drive the motorized cable reel to dispense the electrical power cord. Robot_cable_reel_control process 1425 publishes: (1) messages (e.g., msg/CableLengthAvailable( )) which communicate the length of electrical power cord available, and which are subscribed to by navigation_planner process 1405; and (2) messages (e.g., msg/CablePath( )) indicating the path of the electrical power cord, and which are subscribed to by obstacle_map process 1410.

Obstacle_map process 1410 incorporates the path of the electrical power cord into it's mapping of obstacles so as to prevent the autonomous mobile robot from running over the laid electrical power cord.

In this embodiment, obstacle_map process 1410 subscribes to messages generated by sonar_sensor_control process 1435 and bumper_sensor_control process 1440. One or both of these processes may be eliminated in embodiments where the autonomous mobile robot does not include a sonar sensor and/or bumper sensor. Other embodiments may include other sensors for detecting obstacles, and corresponding processes for providing messages to obstacle_map process 1410 to indicate the presence and/or location of an obstacle.

Other embodiments may use a variety of communication methods which could include a combination of synchronous and asynchronous messaging techniques over a variety of hardware and software architectures. On single processor systems, it is more likely that the specific embodiment would utilize IPC techniques, while in multi-processor systems, the robot would use messaging patterns and protocols specific to the middleware embodiment.

Other embodiments may include other processes in the navigation application such as error handling procedures, additional sensor control processes, frame transform calculations, etc.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

We claim:

1. An apparatus, comprising:
 a robot arm having a proximal end and a distal end, the robot arm being configured to move in response to one or more electrical signals;
 an electrical power cord extending through the robot arm from the proximal end to the distal end, the electrical power cord having a first end and a second end, and further having an electrical plug at the first end thereof;
 a motor-driven cable reel configured to dispense and retract the electrical power cord so as to control a length thereof;
 at least one alternating current (AC) motor connected to the second end of the electrical power cord and configured to receive AC power from the electrical power cord and to operate in response to the AC power;
 an end effector disposed at the distal end of the robot arm, wherein the end effector is configured to selectively grasp and release the electrical plug; and
 at least one sensor disposed at the distal end of the robot arm, wherein the at least one sensor is configured to produce sensor data for controlling the robot arm to dock the electrical plug into an electrical receptacle.

2. The apparatus of claim 1, wherein the electrical plug is a locking electrical plug that is configured to be locked into the electrical receptacle.

3. The apparatus of claim 1, wherein the electrical plug includes three pins, wherein a first one of the pins is configured to be connected to earth ground, and wherein the first pin is at least 0.1875" longer than the other two pins.

4. The apparatus of claim 1, wherein the motor-driven cable reel comprises at least one of: (a) a stepper motor or (2) a servo motor.

5. The apparatus of claim 1, wherein the robotic arm comprises at least one of: (a) a stepper motor or (b) a servo motor.

6. The apparatus of claim 1, wherein a path traveled by the electrical power cord, from the distal end to the proximal end of the robot arm, passes through at least one pulley sheave adjoined to the robotic arm.

7. The apparatus of claim 1, wherein the robotic arm comprises a 5-axis articulated robotic arm.

8. The apparatus of claim 1, further comprising at least one cord tensioner.

9. The apparatus of claim 1, further comprising a tension measurement device configured to measure a tension in the electrical power cord, wherein the motor-driven cable reel is configured such that when the tension exceeds a threshold the motor-driven cable reel dispenses an additional length of the electrical power cord.

10. The apparatus of claim 1, further comprising a power converter, wherein the power converter is configured to receive alternating current electrical power from the electrical power cord and to provide direct current electrical power.

11. The apparatus of claim 1, wherein the at least one sensor includes an image sensor configured to capture image data for an area in a vicinity of the distal end of the robot arm.

12. The apparatus of claim 11, wherein the image sensor captures infrared image data.

13. The apparatus of claim 11, wherein the image sensor is located at the proximal end of the electrical cord plug, and transmits the image data via a cable embedded into the electrical cord.

14. The apparatus of claim 11, further comprising a processor wherein the processor is configured to:
control movement of the robot arm; and
execute an algorithm to move the robot arm so as to dock the electrical plug into the electrical receptacle.

15. The apparatus of claim 14, wherein the at least one sensor includes at least one acoustic transducer configured to produce acoustic data indicating a distance from the electrical plug to the electrical receptacle, and wherein the processor is configured process the data from the at least one acoustic transducer to ascertain the distance from the electrical plug to the electrical receptacle.

16. The apparatus of claim 1, further comprising:
an electrical receptacle configured to be mated to an electrical plug and to supply electrical power to the electrical plug; and
at least one marker adjacent to the electrical receptacle configured to indicate the location of the electrical receptacle.

17. The apparatus of claim 16, further comprising a processor configured to control movement of the robot arm, wherein the processor is configured to execute an algorithm to move the robot arm so as to dock the electrical plug into the electrical receptacle.

18. The apparatus of claim 17 wherein the marker comprises at least one mark configured to indicate the position of the electrical receptacle with respect to the image sensor on the distal end of the robot arm and during the docking process.

19. The apparatus of claim 17, wherein the electrical receptacle is a locking electrical receptacle that is configured to lock an electrical plug to which the electrical receptacle is mated.

20. The apparatus of claim 17, wherein the electrical receptacle includes three sockets each configured to receive a corresponding pin of the electrical plug, wherein a first one of the sockets is configured to be connected to earth ground, and wherein the first socket is at least 0.1875" deeper than the other two sockets.

21. The apparatus of claim 17, wherein the marker comprises at least one light emitting device configured to transmit one or more signals in the infrared or visible frequency range.

22. The apparatus of claim 21, further comprising a shading structure disposed above the at least one light emitting device and configured to at least partially shade the at least one light emitting device from ambient light.

23. The apparatus of claim 21, further comprising a processor configured to execute an algorithm to control the at least one light emitting device to transmit the one or more signals.

24. The apparatus of claim 23, further comprising a wireless transceiver configured to transmit a transmit signal including transmit data generated by the processor, and further configured to receive a receive signal including receive data and to provide the receive data to the processor.

25. The apparatus of claim 21, further comprising an acoustic transducer configured to transmit an acoustic beacon signal.

26. The apparatus of claim 25, further comprising a wireless radio transceiver, wherein the processor is configured to cause the apparatus to execute an algorithm comprising:
controlling the wireless transceiver associated with the robotic arm, to transmit a wireless radio signal to a second transceiver associated with the electrical receptacle, the wireless signal including a request that a second acoustic transducer associated with the electrical receptacle transmit an acoustic signal;
receiving a response wireless radio signal from the second transceiver;
receiving the acoustic signal from the second acoustic transducer; and
performing a time-of-flight calculation in response to the response wireless radio signal and the acoustic signal to ascertain the distance from the electrical plug to the electrical receptacle.

27. The apparatus of claim 17, further comprising a RF or microwave transmitting device configured to transmit one or more signals in a frequency range of 433 MHz to 5.8 GHz.

28. The apparatus of claim 27, further comprising:
a directional antenna and receiver configured to receive a signal transmitted by a transmitter associated with the electrical receptacle; and
a processor configured to determine the location of at least one electrical receptacle from the received signal and to store in the memory location data for the locations of each electrical receptacle for which the location has been determined.

29. The apparatus of claim 17, wherein the electrical receptacle includes at least two sockets at a first side of the apparatus, each socket being configured to receive a corresponding pin of the electrical plug, wherein the apparatus further includes at least two prongs protruding from a second side of the apparatus which is opposite the first side, wherein each of the two prongs is connected to one of the sockets, and wherein the two prongs are configured to be plugged into a standard electrical receptacle.

30. An apparatus, comprising:
a robot arm having a proximal end and a distal end, the robot arm being configured to move in response to one or more electrical signals;
an electrical power cord extending through the robot arm from the proximal end to the distal end, the electrical power cord having a first end and a second end, and further having an electrical plug at a first end thereof;

a motor-driven cable reel configured to dispense and retract the electrical power cord so as to control a length thereof as at least one of:
  (1) the robot arm moves, and
  (2) a mobile robot to which the robot arm is attached moves while the electrical plug is plugged into an electrical receptacle;
an end effector disposed at the distal end of the robot arm, wherein the end effector is configured to selectively grasp and release the electrical plug; and
at least one sensor disposed at the distal end of the robot arm, wherein the at least one sensor is configured to produce sensor data for controlling the robot arm to dock the electrical plug into the electrical receptacle.

* * * * *